United States Patent [19]

Pepperl et al.

[11] 4,094,010

[45] June 6, 1978

[54] OPTICAL MULTI-CHANNEL DIGITAL DISC STORAGE SYSTEM

[75] Inventors: Rudiger Pepperl, Pinneberg; Johann Krüger, Quickborn; Bernhard Hill, Hamburg, all of Germany

[73] Assignee: U.S. Philips Corporation, New York, N.Y.

[21] Appl. No.: 686,120

[22] Filed: May 13, 1976

[30] Foreign Application Priority Data

May 21, 1975 Germany .............................. 2522405

[51] Int. Cl.² ......................... G11B 21/10; G11B 7/00
[52] U.S. Cl. .................................... 365/215; 358/128; 360/77; 365/234
[58] Field of Search ................. 340/173 LM, 173 LT; 358/128; 360/48, 49, 50, 77, 78, 114

[56] References Cited

U.S. PATENT DOCUMENTS

| 3,573,471 | 4/1971 | Kolb | 340/173 LM |
|---|---|---|---|
| 3,654,624 | 4/1972 | Becker et al. | 340/173 LM |
| 3,720,924 | 3/1973 | Aagard | 340/173 LT X |
| 3,737,877 | 6/1973 | Feinleib | 340/173 LM X |
| 3,919,697 | 11/1975 | Walker | 340/173 LM |
| 3,962,688 | 6/1976 | Westerberg | 340/173 LT X |

FOREIGN PATENT DOCUMENTS

436,391  7/1974  U.S.S.R. .................... 340/173 LM

Primary Examiner—Bernard Konick
Assistant Examiner—Donald E. McElheny, Jr.
Attorney, Agent, or Firm—Frank R. Trifari; Simon L. Cohen

[57] ABSTRACT

An optical storage system for the simultaneous or random storage of digital information in a plurality of channels, comprising a rotating storage disc which is scanned by a light beam. The digital information of each channel is stored in points along a spiral track comprising interruptions. A concentrical guide track is associated with each channel. The light beam being focussed onto both tracks of each channel for optical addressing. The light beams of all channels are controlled via deflection systems so that, during the interruptions, they are briefly directed onto the guide tracks while following the spiral tracks. From the radial deviation of the moving disc, measured by way of a detector system, control signals are derived by the deflection systems to compensate for undesired radial motions of the spiral-shaped tracks.

15 Claims, 15 Drawing Figures

OPTICAL MULTI-CHANNEL DIGITAL DISC STORAGE SYSTEM

The invention relates to an optical storage system for the simultaneous or random storage of digital information in a plurality of channels, comprising a rotating storage disc which is scanned by a light beam.

Digital storage systems are known already which utilize the high storage density which can be achieved by optical methods. For example, U.S. Pat. No. 3,624,284 describes the photographic recording of digital information and a playback system which includes an optical scanner. The scanner of this system deflects a light beam in two dimensions, so that the data are recorded on a stationary disc in the form of a spiral. However, this system has the following drawbacks — the extremely high storage densities which are in principle possible in optical recording cannot be achieved, because the light beam is guided along the data spiral when the data are retrieved in a manner so that the scanner alternately scans the right and the left half of the data track. Furthermore, this system does not offer random access to the data stored, because the scanner is bound to the spiral in which the data have been recorded.

Also known are storage systems where information is stored on a rotating disc by optical means, for example, the "VLP" system described in Philips Technical Review, Volume 33, 1973 No. 7, pages 178 - 180.

According to this system, the objective which focusses the light beam on the storage plane during storage as well as during retrieval, must be guided across the disc in the radial direction by a mechanical system. Furthermore, the data track must have a well-defined structure perpendicular to the radial direction, so that a control signal for controlling the objective in the radial direction can be derived from this structure. The storage density and the quality of the signal recovered during playback are limited. Furthermore, a position-sensitive detector or a plurality of detectors are required for guiding the light beam on the data track during the retrieval of the information.

The invention has for its object to eliminate the drawbacks of the known storage systems and to offer random access to the data stored information, a high storage density and capacity, and to improve the guide control for the light beam for this purpose.

This object is achieved in that the digital information of each channel is stored point-wise along a spiral track containing interruptions, each channel being assigned a concentric guide track, the light beam being focussed on both tracks of each channel for optical addressing, the light beams of all channels being controlled by deflection systems so that, while following the spiral tracks, they are directed briefly onto the guide tracks during the interruptions, control signals being derived from the radial deviation of the moving disc, measured by way of a detector system, by the deflection systems for the compensation of undesired radial motions of the spiral-shaped tracks.

An advantage according to the invention consists in that no positionsensitive detector systems are required and in that no unused intermediate space is present between the data tracks, while the guide control for the light beam is still improved.

A preferred embodiment of the device in accordance with the invention will be described in detail hereinafter with reference to the drawing.

FIGS. 7, 9, 10, 11 and 14 show details of the arrangement shown in FIG. 3, and FIGS. 8, consisting of $a$ through $e$, 12 and 13 show time diagrams for the signals.

Figures 1, 1A:
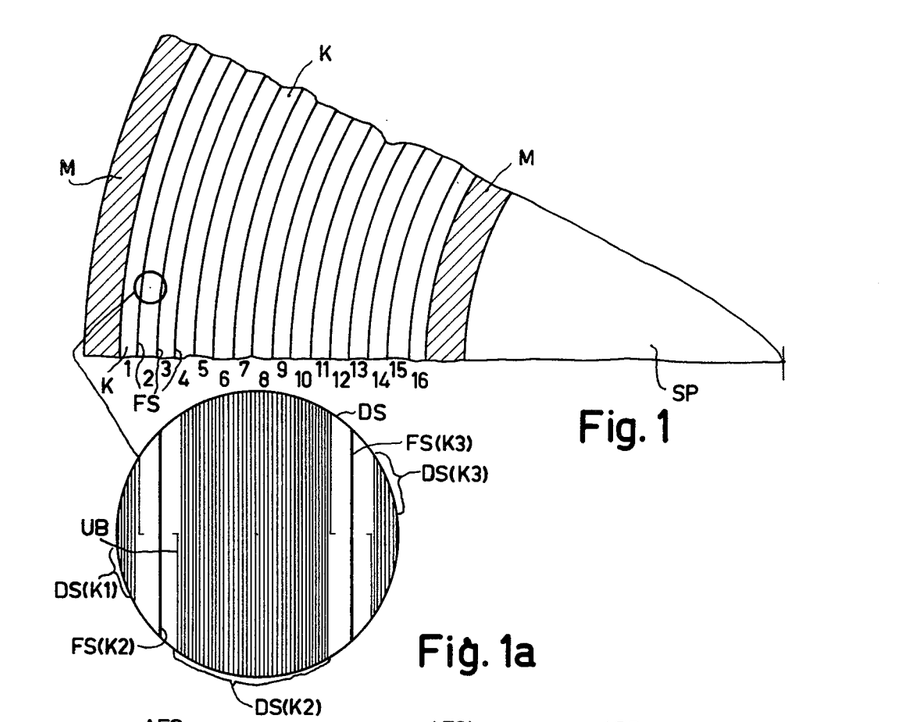
FIG. 1 shows a sector of the storage disc which illustrates the sub-division of the storage surface into a plurality of channels.
FIG. 1a shows a detail at an increased scale of the storage surface of the three neighboring channels to illustrate the sub-division of a channel into a concentric guide track and a spiral-shaped data track.

The storage disc SP of FIG. 1 can be made, for example, of a glass substrate, having a diameter of 40 cm and a thickness of 1.5 cm, on which the storage material is deposited in the form of a thin layer of metal or synthetic material. It is known that a hole can be locally burned into such layers or that the absorption or reflection can be locally changed by means of a focussed light beam. In a further embodiment, the storage layer can consist of a thin magneto-optical layer in which magnetic domains can be formed by heating by means of the focussed light beam and a simultaneously applied magnetic field. In principle, any physical or material modification of the storage material effected by the light beam can be utilized as long as these modifications are local and permanent.

It is known that holes having a diameter of approximately 1 micrometer can be burned in bismuth films having a thickness of approximately 400 A by means of a focussed light beam when 10 nJ energy is applied. For a recording duration of 2 microseconds, this corresponds to a light power of 5 mW per data track.

The storage disc of the proposed system is sub-divided into concentric storage regions which are each capable of accommodating the information of a message block and which are referred to hereinafter as channels. FIG. 1 shows a sector of the storage disc SP. The information is recorded in each channel, denoted by the channel numbers K1, 2, . . . 16, on a spiral which is referred to as the data spiral DS of the channel $K_i$. Moreover, each channel $K_i$ comprises a concentric track which serves as the guide track FS for the data spiral of the channel $K_i$. Furthermore, there are two metallized tracks M which will be discussed hereinafter.

Figure 2:
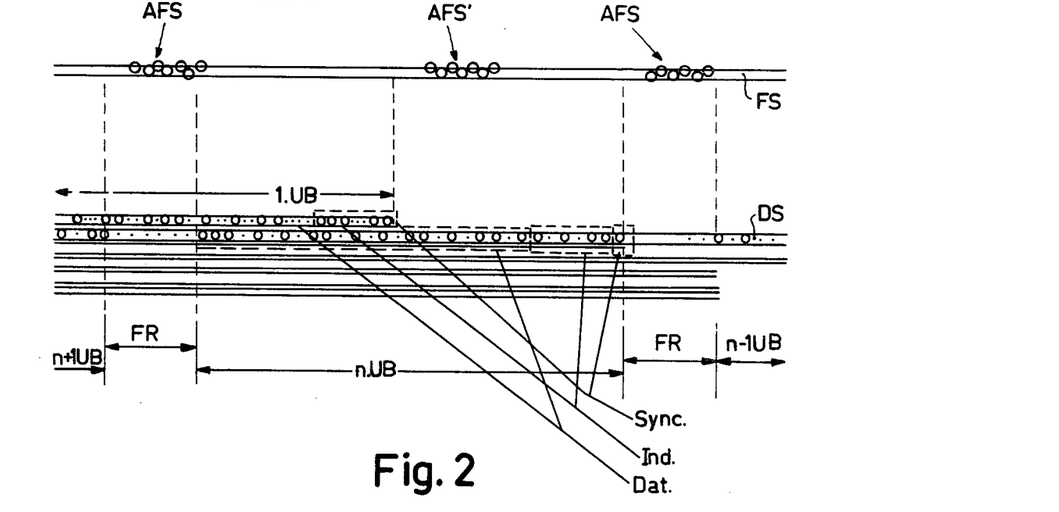
FIG. 2 shows part of the guide track and the data track of a channel to illustrate the organization of the data track and the scanning of the guide track.

The sub-division of a channel into a guide track FS and a data spiral DS is shown in FIG. 1a. This Figure shows data spirals (or parts thereof) DS(K1), DS(K2 and DS(K3) of the channels K1, K2 and K3, FS (K2) and FS (K3) being corresponding guide tracks. The guide track FS can be realized, for example, by way of a groove which is burned into the disc. The data to be stored is stored on the data spiral DS in sub-blocks UB of 128 bits. As is shown in FIG. 2, each sub-block UB can commence, as is shown for the first sub-block 1. UB, with a clock bit Sync. and a plurality of index bits Ind which are used for controlling the rotary speed of the disc and for locating the data. Between the subblocks UB the data spiral DS comprises a void space FR which equals the space required by a plurality of data bits. The time during which this void space passes the write or read beam is utilized to scan the guide track FS to derive the control signals for correcting small deviations of the storage disc in the radial direction by small adjustment motions of the imaging optical system. The scanning instants are denoted by the reference AFS in FIG. 2. AFS' is a scan before the first data block.

In the case of an average storage disc diameter of 33 cm, the length of the data spiral which can be scanned by the light beam during one revolution of the disc amounts to approximately 100 cm. For a mean bit interval of 2 micrometers, 500 kbits can be located in one turn. If a data spiral consists of 2000 turns, the storage capacity of a channel amounts to 1 Gbit. In the case of a data spiral pitch of 2 micrometers, the radial space required amounts to 4 mm. The space required in the radial direction for the said storage channel should be increased by the space required for the guide track and for the safety clearance between guide track and data spiral as well as between the individual channels. The safety clearances are essentially determined by the reproducibility of the positioning of the disc on the disc apparatus, with little mechanical effort, during the realization of the disc recording, and also by the reproducibility of the data playback with different apparatus, so that the data stored can also be retrieved by other apparatus of the same construction. Therefore, 1.5 mm is assumed as the radial space required for the overall safety clearance. Therefore, a storage disc having an overall diameter of 40 cm can accommodate, for example, 16 channels or message blocks which have a radial space requirement of 8.8 cm.

The overall storage capacity of a 16-channel system then amounts to 16 Gbits. The data rate of this storage system is determined by the number of revolutions of the disc per unit of time. In the case of 60 revolutions per minute, the data rate amounts to 500 Kbits per second when the data are consecutively stored in the channels or are consecutively retrieved from the channels. However, if all 16 channels are operated in parallel in an arrangement comprising 16 channels, the data rate amounts to 8 Mbits per second.

Figure 3:
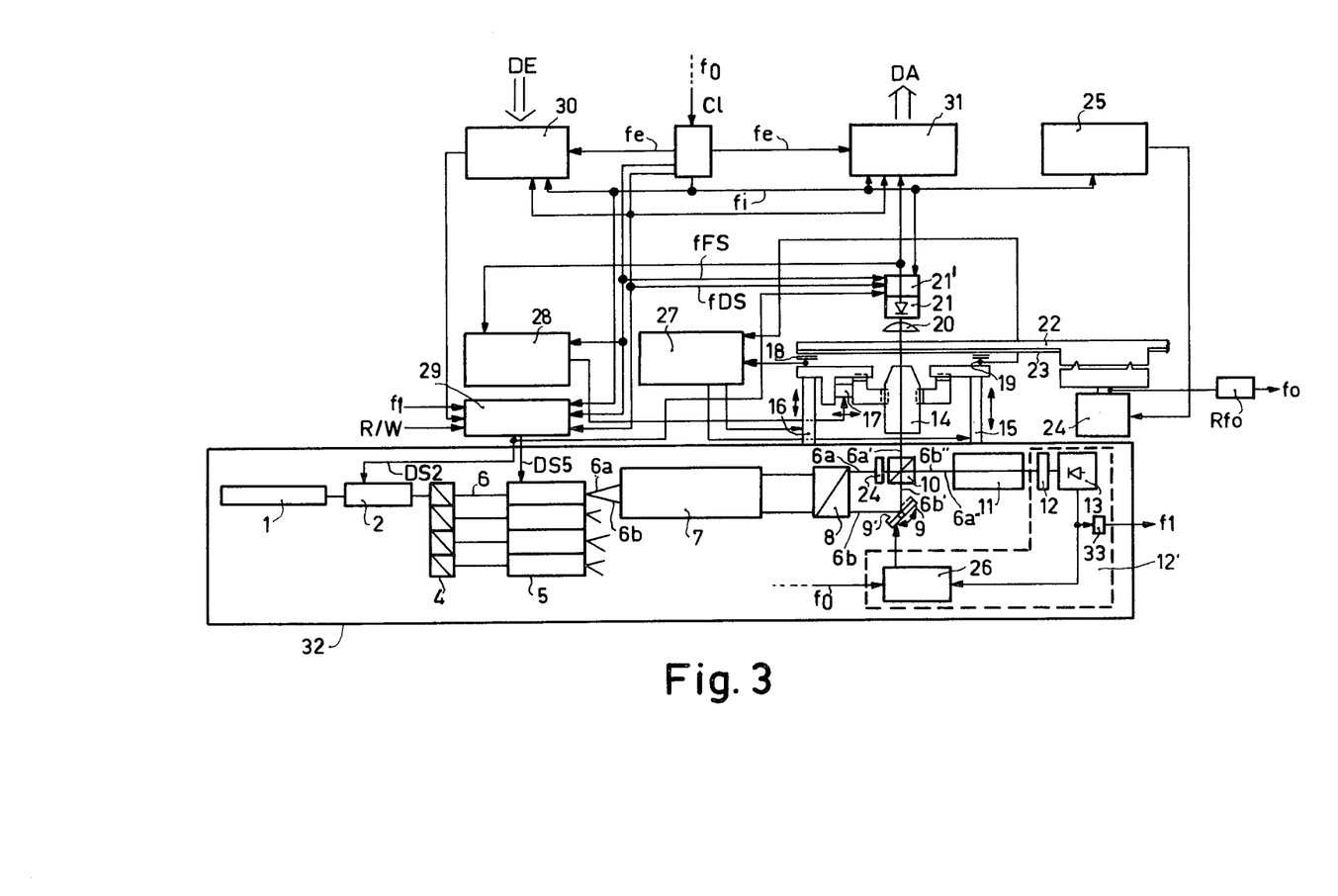
FIG. 3 shows a block diagram of the multi-channel storage system for digital optical data recording and retrieval.

The optical system consists of a plurality of groups of the same construction. Each group can cover, for example, a plurality of channels. FIG. 3 shows the optical system for one channel. All channels of a group have in common a light source 1 and a first fast digital light deflector 2 which is controlled by a switching stage 29 which receives the input data from the data input 30. The switching stage 29 consists of a switch which is controlled by the clock generator C1, the said switch switching the pulses supplied by the data input 30 to the guide tracks or the data tracks by activating the fast digital light deflectors 2 and 5. The continuously applied data input signal is compressed in order to gain time for producing or scanning guide segments on the storage disc. This is elaborated with reference to FIG. 9.

The light source 1 generates a light beam which is so intense that it can be split into two individual light beams at a later stage; this is a so-termed "double beam". In the beam splitter 4, the double beam 6 is split as many double beams as there are channels in a channel group.

Hereinafter, a description will be given of the components wherethrough the light beam passes in one channel. The same is applicable to the other channels of a channel group. These components are: a second fast digital light deflector 5, a beam expansion optical system 7, a prism 8, a light deflector 9 which is slower than the fast light deflectors and which comprises a piezoelectrically or electro-dynamically controlled mirror 9', a beam splitting cube 10, and an imaging objective 14. The fast light deflectors can be constructed as a digital electro-optical light deflector, as described, for example, in Physics Letters, Volume 12, pages 205 - 206 (1964), or as an accustic-optical light deflector as described, for example, in IEEE Transactions on Electron Devices, Volume ED-17, pages 229 - 235 (1969).

The first fast light deflector 2, when activated by the switching stage 29 for this purpose, enables the double light beam to be quickly switched between two beam directions. These two beam directions correspond to two semi-overlapping focal point positions on the storage disc 22 which are used for scanning the guide tracks. The second fast light deflector 5, controlled by the switching stage 29 of the data input 30, has two functions. First of all, it can switch the double light beam 6 to two spatially completely separated light paths 6a, 6b. One light path is referred to hereinafter as the control beam path 6a, a light beam which has completed this path being referred to as the control beam, while the other light path is referred to as the data beam path 6b and a light beam which has completed this light path is referred to as the data beam. Secondly, the deflector 5 modulates the intensity of the beam 6a or 6b in that the light beam is switched either only to a position of the data beam path 6b or to the focal point positions of the control beam path 6a. The control beam path 6a includes an absorption filter 24 which attenuates the light beam to an extent so that the intensity no longer suffices to modify the information status of the storage layer 23. The two double beams 6a and 6b are expanded in an optical system 7; the subsequent prism 8 parallels the control beam path and the data beam path. The control beam 6a is split by a beam splitting cube 10 or a semi-transparent mirror. A sub-beam 6a' is focussed onto the storage layer 23 of the storage disc 22 by an objective 14. This sub-beam scans the guide track of each channel. The second sub-beam 6a'' is imaged on a mask 12, behind which a detector arrangement 13 is arranged, by an objective 11. The data beam 6b is incident on the slow mirror deflector 9. This mirror deflector is constructed to serve, for example, 2000 directions. These beam directions are imaged in 2000 focal point positions on the storage layer 23 by the objective 14. Part of the data beam 6b'' is also deflected in the objective 11 by the beam splitting cube 10, so that the data beam is also imaged on the mask 12.

The mask 12 and the detector arrangement 13 can consist, for example, of a strip provided with a line of holes and a strip detector. The mask is adjusted so that the guide beam 6a'' is incident on the first hole. The mask is then directed so that the line produced by the holes corresponds to the line formed in the plane of the mask by the light deflector 9 by means of the data beam 6b''. Moreover, the starting position of the light deflector 9 is also adjusted to the first hole. The number of holes corresponds to the number of achievable revolutions of the data mirror of each channel. During the scanning of the mask 12 by the light beam 6b'', an amplitude-modulated signal is measured on the detector 13, a corresponding pulse being derived from this signal, i.e. a maximum value of the signal per turn of the spiral.

The feasible positions of the data beam 6a and the position of the guide beam 6b are compared on the hole grid in the mask 12. As a result, first a fixed relationship is established between guide beam direction and data beam direction, and secondly the pitch of the data spiral is determined by grid distance of the mask 12. An electronic control unit 26 controls the light deflector 9 by way of the reference signals from the detector arrangement 13. The mask 12, the detector system 13 and the control unit 26 for the slow light deflector 9 are combined to form one unit and are referred to hereinafter as the optical measuring ruler 12'.

The light deflector 9 can be activated, for example, by means of a sawtooth voltage which is controlled by the control unit 26, so that the deflected light beam is freely guided to the next grid position on the mask 12 on which it is accurately incident.

The purpose of the measuring ruler can be summarized as follows:

(a) obtaining a high resolution for the mirror deflector 9 which cannot be obtained by analog actuation only;

(b) determining the same grid for the data tracks (pitch of the data spiral) by the mask 12 for all disc stores (apparatus);

(c) determining the mirror deflector starting position by adjustment of the guide beam 6a'' and of the data beam 6b'' on the first grid point of the mask 12 when the disc store (machine) is adjusted for the first time.

The time required by the light beam 6b'', deflected by the light deflector 9 and focussed on the data spiral, for completing the pitch of the data spiral is chosen by the rise of the sawtooth voltage so that it is slightly shorter than the time required for one revolution of the storage disc. The pulse indicating a revolution of the storage disc can be derived, for example, from the shaft of the disc drive (Rfo, FIG. 3), and can control transistor switches in the control unit 26 by means of which the charging or discharging of a sawtooth voltage capacitor, on the basis of the detector signal, is switched. See also the description given with reference to FIGS. 7 and 8.

Each grid position is correlated to one revolution of the storage disc 22 which is driven by a motor 24. The accuracy and the reproducibility of the pitch of the data spiral is obtained by means of the optical measuring ruler 12'. Because all channels of a channel group have the axis of the light deflector 9 and the beam splitter 10 in common, only one optical measuring ruler 12' is required per channel group.

The light source 1, the light deflection systems 2, 5, 9 and the associated optics are accommodated on a base plate 32. It must be assumed, however, that the storage disc 22 moves slightly in the radial and the vertical direction with respect to this base plate. The motions of the storage disc 22 in the radial direction are compensated for by small displacements of the objective 14 in the radial direction. The radial movement of the storage disc 22 is covered in each channel by the control beam 6a. In given time intervals this beam scans, by means of the first fast light deflector 2, the guide track at the right and at the left by way of the two focal point positions of the control beam. On the basis of a resultant difference signal it is determined to which side of the guide track the control beam has shifted. When the adjustment is correct, the difference signal amounts to zero. The difference signal actuates a piezoelectric column 17 which moves the objective 14 of each channel in the radial direction.

The small motions of the storage disc in the vertical direction are compensated for in common for all objectives 14 of a channel group. To this end, all objectives are arranged on a single plate. This distance control is required, because the objectives 14 have a depth of focus of only a few micrometers for a resolution of 2000 tracks and a track spacing of 2 micrometers. The combined control for the objectives of a channel group is possible because the substrate for the storage layer 23 can be polished flat to two interference rings in regions of approximately 20 cm in diameter and because the mechanical bending of a glass substrate having a thickness of 1.5 cm amounts to less than one micrometer over a length of 20 cm. The known capacitance principle can be used for distance control; this principle is described, for example, in Philips Technical Review, Volume 33, 1973 No. 7 pages 190 – 193.

Figure 4:
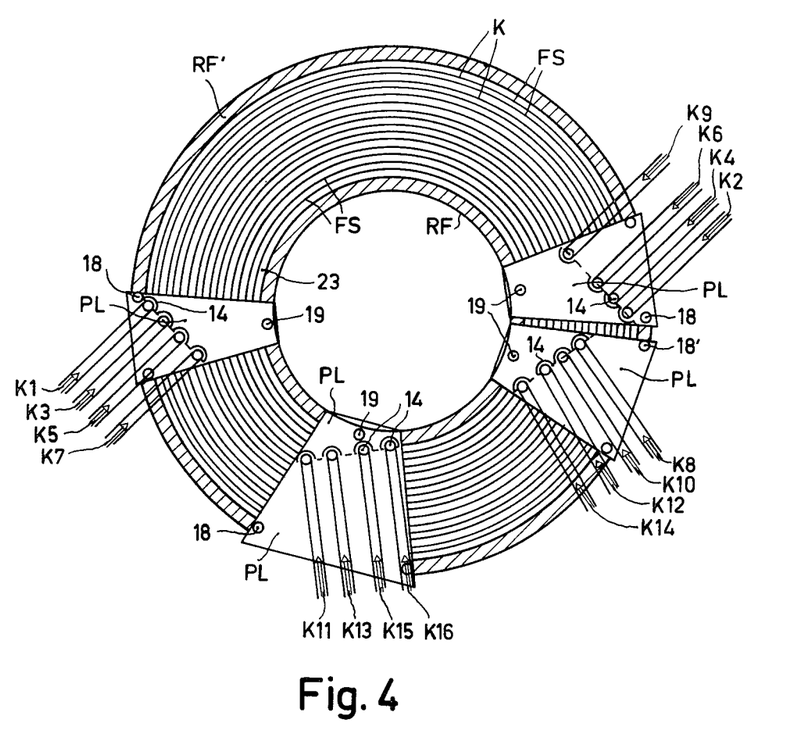
FIG. 4 is an underview of the storage disc to illustrate the adjusting faces of the imaging objectives of different channels.

To this end, for example, three capacitances per channel groups are measured, two of the said capacitances being situated on the outer ring (18, 18') and one capacitance being situated on the inner ring (FIG. 4). FIG. 4 is a plan view of the storage layer and the arrangement of the objectives 14 on a plate P1 which measures the distance from the storage layer 23 by means of measuring capacitances. The shaded ring surfaces RF and RF' at the inner and the outer periphery are metallized and each surface represents a plate of the measuring capacitances 18, 18', 19. Each capacitance is associated with a distance control system 27, each of which actuates a piezoelectric column 15, 16 which is arranged on the optical base plate (FIG. 3).

Piezoelectric adjusting members of this kind have been described by M. D. Graham in "Rev. Sci. Instr. 45", No 8, pages 1026 – 1037 (1974) and by J. V. Ramsay, E. G. V. Mugridge in "Journ. Sci. Instr. 39", (1962), pages 636 – 637.

Each channel requires only one stationary, location-independent detector 21 whose pulses are distributed, via 21', between the adjusting stage 28 and the data output 31. The detector 21 is arranged either behind the storage layer, in the case of transmission reading, or in front of the storage layer, in the case of reflection reading. In the case of reflection reading, the mirror 9' of the slow light deflector 9 is replaced by a beam splitting cube. In front of the detector 21 there is arranged a lens 20 which collects the light which is reflected or transmitted by the storage layer 23.

After a blank storage disc 22 has been positioned, each objective group, consisting of the objectives 14, is adjusted to a given distance from the storage layer by the scanning control system 27, the said distance being determined by the capacitances 18, 18', 19. Subsequently, the slow light deflector 9 is adjusted so that the light beam is deflected in the direction dictated by the guide beam 6a'. During this deflection, the beam passes through the first hole of the measuring ruler, and this is detected in 33, so that the starting position is defined. The detection of the first hole produces the starting signal fi. Subsequently, a concentric guide track FS is written in the storage layer 23 by means of the data beam 6b'. After that, the spiral-shaped data track DS is written. To this end, the sub-beam 6b'' of the data beam 6b, deflected by the light deflector 9, is directed onto the first grid point for the data spiral of the optical measuring ruler 12', and the first data block is written by means of the sub-beam 6b'. After that, the fast light deflector 5 switches over from the data beam 6b to the guide beam 6a. The beam path 6 is split by the light deflector 2, so that the guide track FS can be scanned by the beam path 6a with two overlapping point positions. Any fluctuations of the storage disc in the radial direction are compensated for by the adjusting system 28 which is actuated by the distributor 21'. Already before the start of the next data sub-block, a changeover to the data beam path 6b takes place, and the next data sub-block is written. The organization of the data as well as the scanning of the guide track FS is shown in FIG. 2.

During the read operation, each objective 14 is adjusted with respect to the guide track of its channel by means of the guide beam 6a. The light deflector 9 addresses a given turn of the data spiral DS; this is checked via the optical measuring ruler 12'. The rotary speed of the storage disc is controlled by means of the synchronization bits of the data spiral which are derived from the data output 31, comprising clock-controlled shift registers like the data input 30, and which are applied to a synchronization stage 25. The synchronization bits also control a clock C1 which supplies the clock pulses for reading the bits each time within a data sub-block UB. The index bits of the data spiral are used for locating the data in the addressed turn of the data spiral DS. The access time for a given turn of the data spiral is determined by the response time of the light deflector 9, and lies in the millisecond range. The access time for a data sub-block is determined by the rotary speed of the storage disc. At a speed of 1 revolution per second, it amounts to approximately 1 second. The response time of the light deflector is negligibly small in comparison.

The light reflected or transmitted from the data bits is measured by the stationary detector 21. The sensitivity of known optical detection systems lies in the range of from $10^{-10}$ to $10^{-12}$ Ws/bit. This corresponds to a light power at the detector of frame $5.10^{-5}$ to $5.10^{-7}$ W/channel for a reading time of 2 microseconds. For an efficiency of 50% of the storage material used, this corresponds to a light power of $10^{-4}$ to $10^{-6}$ W/channel before the storage material. This efficiency is a factor 50 to 5000 smaller than the efficiency required for the write procedure.

A number of aspects of the storage system shown in FIG. 3 will be described in detail hereinafter. The description is given with reference to the FIGS. 5 to 10 which show details and time diagrams.

Figure 5:
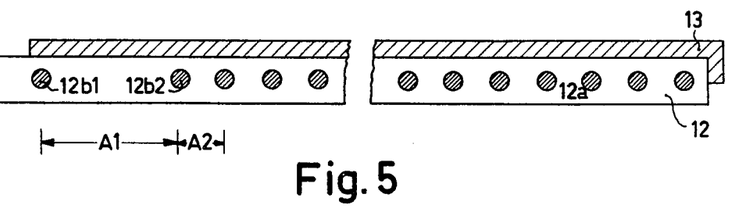
FIGS. 5 and 6 show examples of measuring rulers.

FIG. 5 shows a feasible embodiment of the mask 12 and the detection device 13. The mask is formed by a carrier 12a and comprising holes 12b which are arranged in a line. The distance A1 corresponds to the distance between a guide track and the first turn of the data spiral. The distances A2 correspond to the pitch of the data spiral. The number of holes 12b equals the number of turns of the data spiral of a channel.

The mask is adjusted so that the guide beam 6a" is incident on the hole 12b1 (adjustment of the disc storage machine). Subsequently, the mask is aligned so that the line formed by the holes corresponds to the line produced by the light deflector 9 by way of the data beam 6b" in the plane of the mask. Ths starting position of the mirror reflector 9 is also adjusted to the hole 12b1.

During the scanning of the mask 12 by the light beam 6b", the detector 13 measures an amplitude-modulated signal AS (FIG. 8) which gives an indication per turn of the spiral as regards the extent to which the beam 6b' follows the spiral. The instant at which per turn a maximum value occurs in the detector 13 makes it possible, by comparison with the instant at which it is indicated that the disc has completed one revolution, to control the sawtooth generator included in the device 26 (see further the description given with reference to FIGS. 7 and 8).

Figure 6:
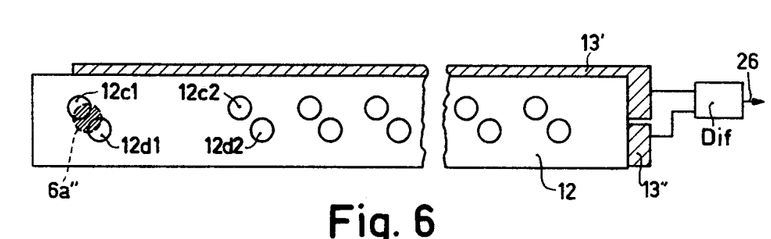
Figure 8:
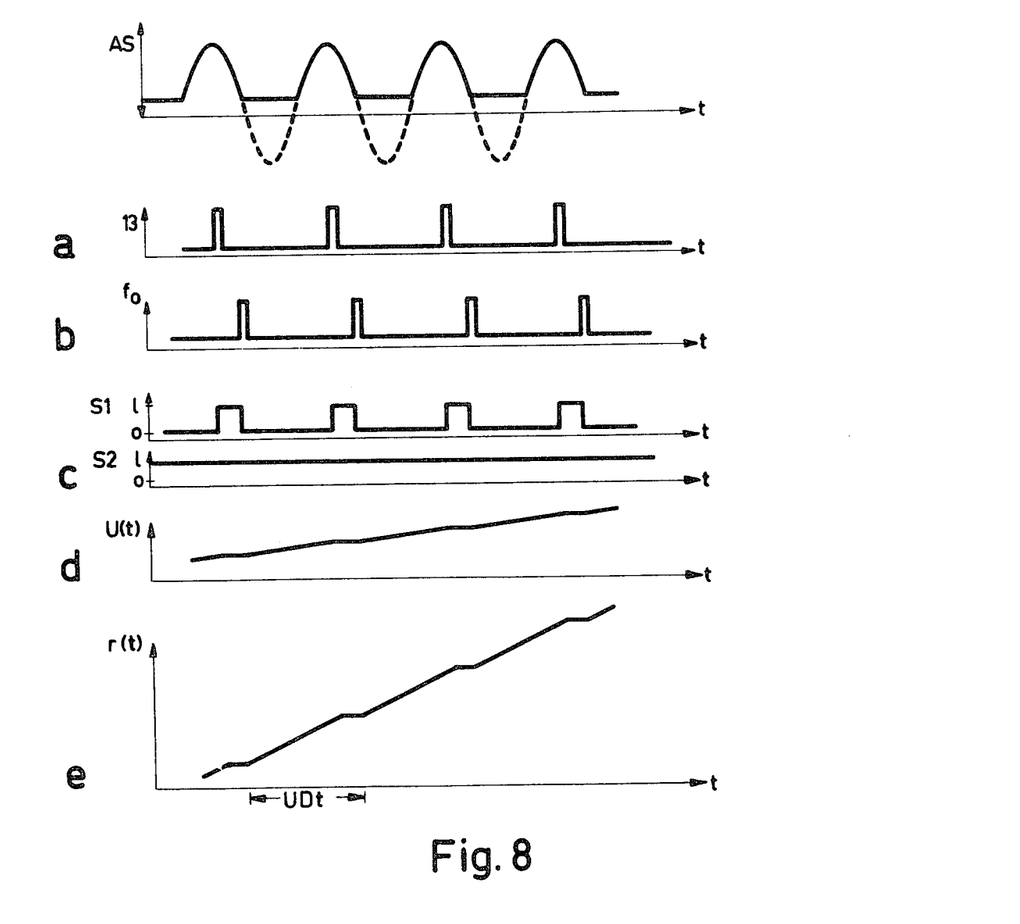

An alternative for the mask 12 and the detector arrangement 13 consists of a mask which comprises two rows of holes 12c and 12d, staggered with respect to each other, and two strip detectors 13' and 13" (FIG. 6). The advantage of this embodiment over the embodiment shown in FIG. 5 consists in that the direction in which the light beam passes across the mask can be determined from the detector signals. The mask is adjusted so that the guide beam 6a" is incident on the hole pair 12c1, 12d1, the hole pairs 12c2, 12d2, . . . then being scanned by the data beam 6b". In the device Dif the difference is established between the detector signals from the strip detectors 13' and 13". The beam is symmetrically positioned on a hole pair when the difference signal is 0. From the shape of the difference signal it can be determined in known manner in which direction the mask 12 is scanned. The detector signals shown in FIG. 8a are derived from the zerocrossing of the difference signal.

Figure 7:
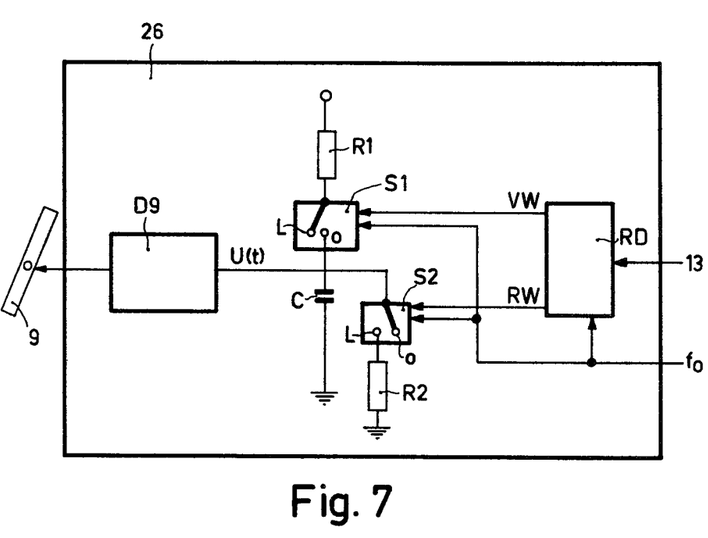

FIG. 7 shows details of the control device of the analog light deflector 26. The signal from the detector 13 is applied in the case of FIG. 5 only after the detection of the maximum value of the signal during a revolution and in the case of FIG. 6 after the determination of the said difference in the difference device Dif), together with the pulses which each time represent 1 revolution of the disc, to the direction detector RD in order to determine the forward direction VW or the backward direction RW. The sawtooth voltage U(t) which serves to control the mirror deflector 9 can be derived from these data (see also the below description with reference to FIG. 8).

The rise of the sawtooth voltage U(t) is determined by the resistor R1 and the capacitance C. For the forward travel of the mirror deflector 9, the capacitance C is charged from a constant voltage supply (not shown) via the resistor R1 via the switch $S_1$ whose position is controlled by the direction detector signal VW of the detector RD and the disc rotation pulse fo.

For the backward travel to the starting position, the switch $S_2$ is closed in the same manner by the signal RW. Backward travel of the mirror deflector over a desired number of track intervals is also possible if the switch $S_2$ is controlled by the detector signal (RW) and the disc rotation pulse fo.

The foregoing is illustrated in FIG. 8 by way of time diagrams. The reference AS denotes the amplitude-modulated signal in the case of a ruler as shown in FIG. 5. (a) represents the signal from the detector 13 (the maximum value of AS or, in the case of FIG. 6, the difference signal from Dif). (b) shows the disc rotation pulses fo. In this case there is forward travel (pulses from 13 lead fo). (c) shows the switching positions of the switches S1 and S2. The diagram (d) shows the sawtooth signal U(t). Finally, the diagram (e) is a representation r(t) of the radial position of the light beam 6b' with respect to the disc. UDt is the dureation of one turn of the data spiral.

Figure 9:
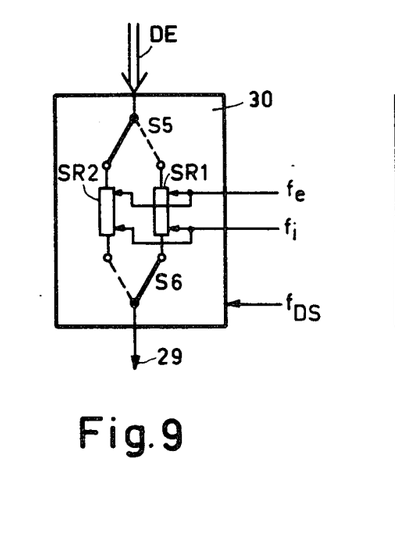
Figure 10:
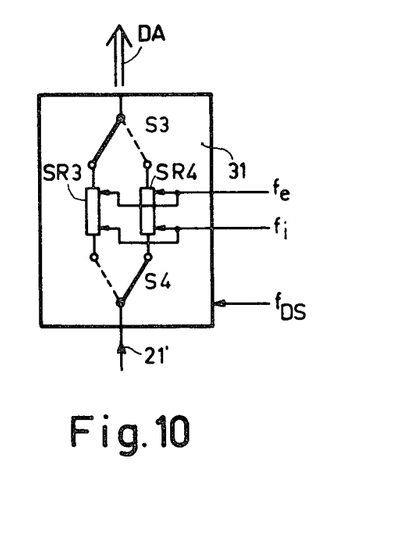
Figure 11:
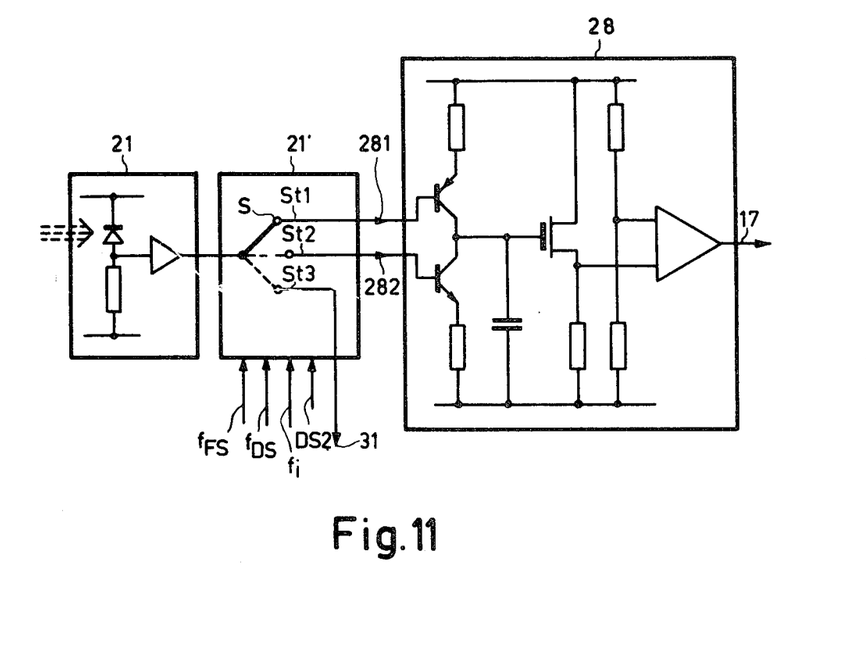
Figure 12:
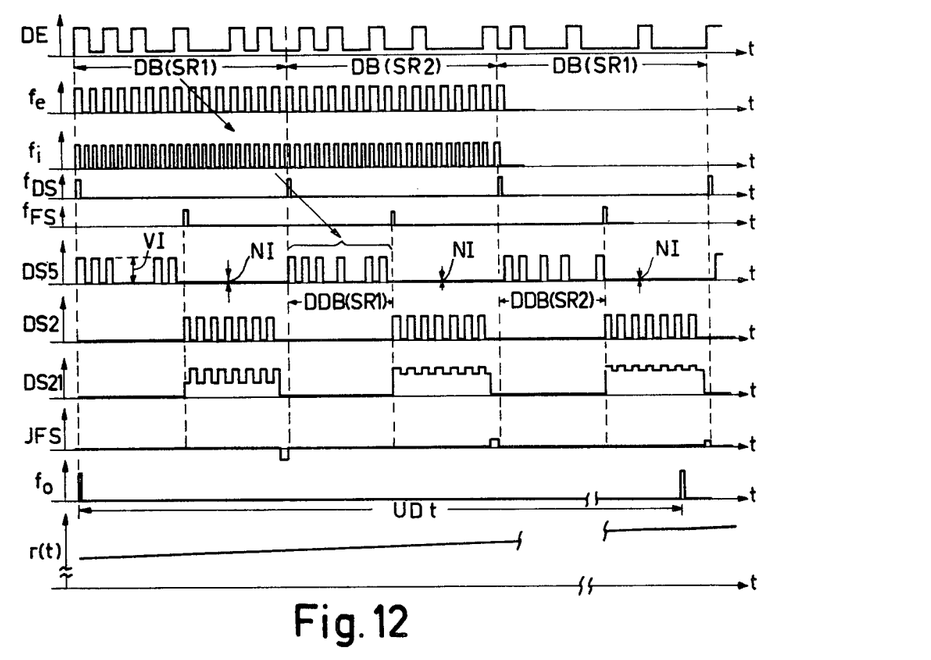
Figure 13:
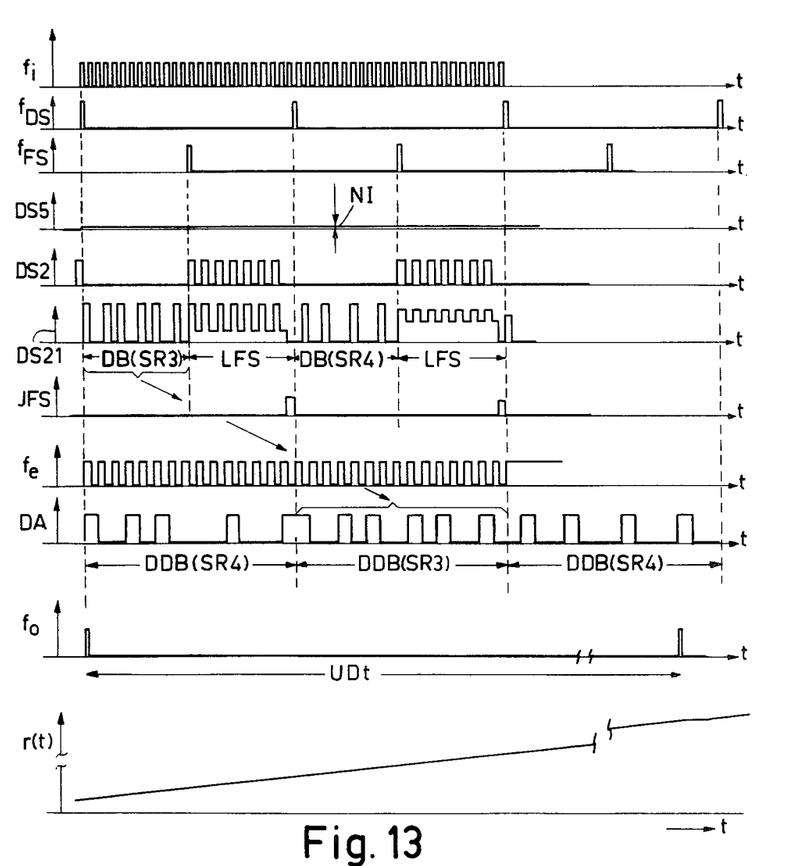

On the basis of FIG. 3 and the details thereof shown in FIGS. 9, 10 and 11, the writing on the disc will be described with reference to the time diagrams shown in FIG. 12; and the reading will be described in time diagrams as shown in FIG. 13. Input data DE are applied to a device 30 (FIG. 3, FIG. 9). The clockpulse generator C1 produces clock pulses of a frequency $f_i$ which provide the internal synchronization of the system. Notably the synchronization of the disc speed is effected on the basis of these pulses in the device 25. The disc drive is realized thereby in 24. The rotation detector R$f_o$ supplies one pulse $f_o$ per revolution which is also used for synchronization purposes. The generator C1 also supplies pulses $f_e$ which relate to $f_i$ so that time is gained to realize the formation or scanning of the guide tracks FS on the storage disc. Pulse series $f_{FS}$ and $f_{DS}$ are derived from $f_i$ in order to determine on the one hand starting instants for the guide tracks and on the other hand starting instants for the data tracks. The derivation can be effected in known manner, for example, the counting of pulses $f_i$ in counters or dividing devices. FIGS. 12 and 13 show how these pulse series are situated in the time relative to each other.

Switches $S_5$ and $S_6$ in the device 30 are controlled by the pulses $f_{DS}$. The data signal DE is thus alternately applied to the register SR1 or SR2 via $S_5$. The input of data blocks to the registers SR1 or SR2 is effected at the frequency $f_e$, see the diagram DE of FIG. 12. Therein, the blocks are denoted by DB (SR1) and DB (SR2), respectively. During a write operation on the disc, the registers SR2 or SR1 are read via the switch S6 at the frequency $f_i$, so that space for one guide track (FS) is obtained. See the diagram DS5 of FIG. 12 which indicates how the digital light deflector 5 is actuated by the data blocks from SR5 and SR6 (denoted by DDB (SR5) and DDB (SR6)) in order to enable the digital information to be written by an intensity variation. The actuation is effected by the device 29 which converts the instants for $f_{FS}$ as well as for $f_{DS}$, in synchronism with $f_i$, into command signals by means of known logical means: DS2 for the fast light deflector 2 for supplying 2 overlapping light spots during the guide track in which the guide track pulses are written during writing. See the diagram DS2 of FIG. 12. $f_{DS}$ is used in 29 in order to deliver the said data signal DS5 for switching the deflector 5. When DS5 is written, the previously written guide track is read again during the blank portions in DS5: the signal DS21 in the detector 21 (diagram DS21, FIG. 12). This signal is transferred, via the distributor V21′, to the adjusting device 28 which provides the adjustment to the guide track. FIG. 11 shows the construction principle of the distributor 21′ and the device 28. The device 21′ comprises a switching device S which is actuated by $f_{FS}$, $f_{Ds}$ and $f_i$.

After a pulse $f_{FS}$, S starts to reciprocate between the positions S$t$1 and S$t$2, under the control of the signal DS2, so that the pulses on the guide track are always considered at the correct instants. Any deviations with respect to the original situation appear as an asymmetry of the signal DS21. This asymmetry is converted in the adjusting device 28, having a differentiating effect on the pulses DS21 applied via the inputs 281 and 281, into an adjusting pulse JFS (see FIG. 12) which is applied to the drive electronics of the piezoelectrical columns 17. The horizontal lines at the top and bottom of the device 28 respectively represent a positive D.C. voltage source (not shown) and ground potential. FIG. 12 again shows the disc revolution pulse $f_o$ having a duration UD$t$, and also the radial position of the data beam 6$b'$. The following takes place during a read operation (see FIG. 13 which utilizes the same notations as FIG. 12): the signal DS5 ensures that the light beam passed by the deflector 5 is adjusted to low (= read) intensity ND. This is contrary to the read operation where the full intensity VI is required for writing a data pulse or a guide track pulse. The necessary external control can be effected by means of an R/W (= read/write) command which is applied to 29. The signal DS2 is active to supply the overlapping focal spot positions for scanning the guide track FS. In the case of a read operation, the detector 21 supplies the signal DS21 of FIG. 13. During the reading of the data spiral (each time between a pulse $f_{DS}$ and a next pulse $f_{FS}$), the blocks of information are transferred to the registers SR3 and SR4, respectively (see the device 31 as shown in FIG. 10): DB(SR3), DB(SR4). The guide track is read between a pulse $f_{FS}$ and a next pulse $f_{DS}$: signal LFS, FIG. 13. The distribution of the said signals by the device 21 is again effected in 21′. During a data block, the switch S is in the position S$t$3 and applies the information to 31. During the scanning of a guide track (after a pulse $f_{FS}$), S reciprocates between the positions S$t$1 and S$t$2 under the control of pulses DS2. The signal LFS is applied to the adjusting device 28, so that adjustment to the guide track can be effected. The device 31 outputs the information alternately arriving in SR3 and SR4 (synchronization frequency $f_i$) on the basis of the frequency $f_e$: these are the data blocks on the output DA which are denoted by DDB(SR3) and DDB(SR4), respectively, in FIG. 13. FIG. 13 again shows the corresponding diagrams for $f_o$ and $r(t)$, the radial position of the data beam 6$b'$, to illustrate the full relationship.

Figure 14:
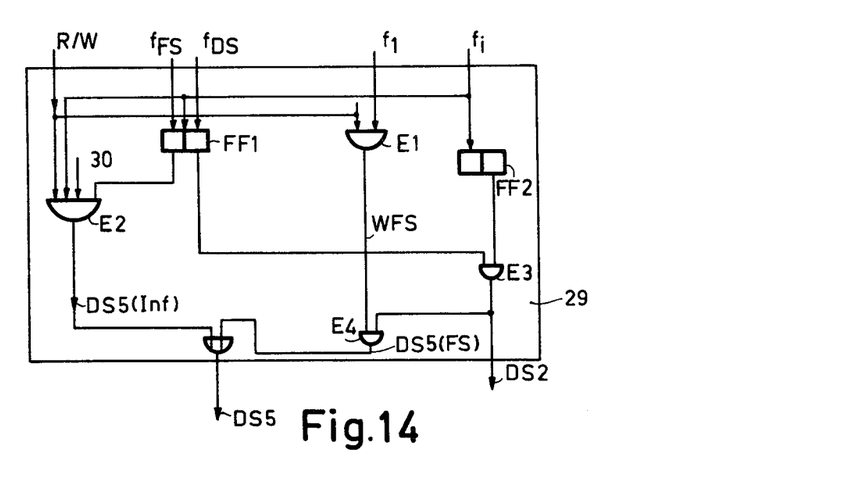

Finally, FIG. 14 shows how the device 29 can be constructed. R/W is a logic 1-signal for a write operation. The frequency $f_i$ serves for the synchronization of various elements of 29. Moreover, in this example $f_i$ is used, in conjunction with the flipflop FF2, to supply pulses which correspond to the pulses DS2 (FIGS. 12 and 13) which control the light deflector 2. This takes place only if a guide track pulse $f_{FS}$ indicates the beginning of a guide track segment and continues until a data track pulse $f_{DS}$ indicates the end of the guide track segment. This is achieved by means of the flipflop FF1 which is controlled by $f_{DS}$ and $f_{FS}$. Consequently, between a pulse $f_{FS}$ and $f_{DS}$ there is a signal available for the AND function gate E3 by means of which the pulses DS$_2$ are applied to the deflector 2. In the case of a write operation as well as in the case of a read operation it is thus achieved that, each time when a guide segment is detected, the deflector 2 supplies the overlapping scanning light spots for such a segment.

If a guide segment is to be written (before a data spiral is written), use is made of the signal $f$1 which is detected in 33 (FIG. 3) and which indicates, via the ruler 12, the location for a guide track on the disc. Assume that $f_1$ has a duration of one complete revolution of the disc: a complete guide circle. R/W = 1, so a signal WFS is present on the output of an AND-function gate E1 on which R/W and $f_1$ are present. WSF means: writing the guide track. In this example, the guide track is written only for the parts between a puls $f_{FS}$ and $f_{DS}$: the output of E3 constitutes the input of the AND-function gate E4 on which WFS is also present. E4 supplies pulses DS$_5$(FS) which drive the deflector 5 to full intensity VI, i.e. the data beam 6$b$ split from the light beam 6 in 5. The pulses DS$_5$(FS) are thus written in the guide track by means of the data beam 6$b$. This is effected before information itself is written. This writing of a guide track is not shown in FIG. 12; FIG. 12 relates only to the actual writing of data. It is alternatively possible to fill a guide track completely with pulses. This can be effected by connecting the output of FF2 to an input E4 rather than the output of E3. If desired, instead of pulses derived from $f_1$, a coded pulse signal can be applied to E4; a coded guide rack pattern which is suitable for addressing purposes is thus obtained.

For writing data in turns of a spiral, the following takes place in 29:R/W = 1 and opens, in conjunction with the condition that an information track segment is "due" (which is governed by the other output of FF1 on which $f_{DS}$ and $f_{FS}$ are present for control purposes), in synchronism with $f_i$, the AND-function gate E2 with the result that the information can flow from 30 to the deflector 5: this the signal DS5 (Inf) which is shown in FIG. 12 and which serves to control the light beam 6b (data beam) to the intensity VI or Ni in accordance with the information itself. The signals $DS_5$ are applied from $E_2$ and $E_4$ to the deflector 5 via the OR-function gate G1.

What is claimed is:

1. A system for the optical storage of information in a plurality of channels, comprising a rotating storage disc divided into a plurality of concentric channel areas, a plurality of concentric guide tracks on the disc, each guide track bordering one of the channel areas, a separate periodically interrupted spiral information track in each channel area on the disc, optical means for sequentially directing a separate control beam of radiation onto each guide track on said disc and for directing a separate information radiation beam onto each spiral information track, a first radial scanning system for substantially uniformly moving the information beam radially along said information track, a second radial scanning system responsive to the interaction of the control beam with the guide track for radially moving both the control and information beams to correct for eccentricity of the guide track, and means connected to said optical means for activating the control beam concurrently with the passage of the information beam into the interrupted portions of the information tracks.

2. A storage system as recited in claim 1, wherein said storage disc comprises a thin storage layer of radiation deformable material, whereby holes corresponding to the information are burned into the material by the information radiation beam.

3. A system as recited in claim 1, wherein the storage disc comprises a magneto-optical storage layer.

4. A system as recited in claim 1, wherein the data is arranged in blocks on the information track, each block comprising a clock bit, the system further comprising a clock pulse generator, means for comparing the clock bits read from the disc with the output of the clock pulse generator, and means for adjusting the rotational speed of the disc in response to the output of the comparing means.

5. A system as recited in claim 1, further comprising means for comparing the positions of the information beam with the position of the control beam and for deriving a fixed relationship between information tracks and guide tracks from said comparison.

6. A system as recited in claim 1, further comprising a separate stationary photo-electric detection means for each channel responsive to the interaction of the information beam with the information track of the channel for converting the stored information into an electrical signal.

7. A system as recited in claim 1, wherein the optical means further comprises a focussing objective, means for sensing radial motions of the storage disc, and wherein the second radial scanning system comprises a radial piezeelectric apparatus for radially moving the objective.

8. A system as recited in claim 1, wherein said first radial scanning system comprises a slow, analog-controlled light deflector, and a fast digital light deflector for selectively moving the light beam in a radial direction either in steps or in an uninterrupted motion.

9. A system as recited in claim 8, wherein the digital light deflector is an electro-optical deflector.

10. A system as recited in claim 8, wherein the fast deflector is an acoustic-optical deflector.

11. A system as recited in claim 8, wherein the fast light deflector comprises means for controlling the information beam and the control beam and for intensity modulating the information beam.

12. A system as recited in claim 8, wherein the means for activating the control beam comprises the fast light deflector.

13. A system as recited in claim 8, wherein the slow light deflector comprises an electrically controlled mirror, a stationary optical measuring ruler, means for reflecting a light beam from the mirror onto the measuring ruler, and photo-detector means behind said ruler for generating an electrical signal to control the position of the mirror.

14. A system as recited in claim 13, wherein said measuring ruler comprises means for controlling the position of the information beam to randomly access any track in the corresponding channel.

15. A system as recited in claim 13, wherein the slow light deflector comprises means for providing radial deflection signals for a group of channels.

* * * * *